US012631066B2

(12) United States Patent
Li et al.

(10) Patent No.: US 12,631,066 B2
(45) Date of Patent: May 19, 2026

(54) DEVICE FOR CONTROLLING OPENING AND CLOSING OF WINDOW BLINDS

(71) Applicant: IDEA OVEN LABS INC., Burnaby (CA)

(72) Inventors: Bo Li, Burnaby (CA); Xing Yu Wang, Burnaby (CA); Ajay Raman, Burnaby (CA)

(73) Assignee: IDEA OVEN LABS INC., Burnaby (CA)

( * ) Notice: Subject to any disclaimer, the term of this patent is extended or adjusted under 35 U.S.C. 154(b) by 247 days.

(21) Appl. No.: 18/561,716

(22) PCT Filed: Apr. 28, 2022

(86) PCT No.: PCT/CA2022/050654
§ 371 (c)(1),
(2) Date: Nov. 16, 2023

(87) PCT Pub. No.: WO2022/246537
PCT Pub. Date: Dec. 1, 2022

(65) Prior Publication Data

US 2024/0240519 A1 Jul. 18, 2024

Related U.S. Application Data

(60) Provisional application No. 63/193,374, filed on May 26, 2021.

(51) Int. Cl.
*E06B 9/38* (2006.01)
*E06B 9/28* (2006.01)

(52) U.S. Cl.
CPC . *E06B 9/38* (2013.01); *E06B 9/28* (2013.01)

(58) Field of Classification Search
CPC . A47H 1/13; A47H 1/14; A47H 1/142; A47H 1/144; E06B 9/28; E06B 9/3032;
(Continued)

(56) References Cited

U.S. PATENT DOCUMENTS 793,899 A * 7/1905 Nelson .................... A47H 1/13
248/254
803,454 A * 10/1905 Thomas et al. ........... E06B 9/50
248/217.2

(Continued)

FOREIGN PATENT DOCUMENTS

CA 3006795 A1 12/2018
CN 105317359 A 2/2016

(Continued)

*Primary Examiner* — Johnnie A. Shablack
(74) *Attorney, Agent, or Firm* — D'Ambrosio & Menon, PLLC; Usha Menon

(57) ABSTRACT

A device controls opening and closing of window blinds connected to a headrail. A clamping module for securing the device to the headrail includes an upper clamp member for engaging an upper surface of the headrail and a lower clamp member for engaging a lower surface of the headrail. The upper clamp member and the lower clamp member are movably coupled to each other so as to enable clamping of the headrail by the upper clamp member and the lower clamp member. A drive module is coupled to the clamping module and includes an actuator for connecting to a tilting mechanism configured to open and close the window blinds. A drive mechanism is operatively coupled to the actuator and is configured to drive movement of the actuator such that the tilting mechanism is operated when connected to the actuator.

21 Claims, 9 Drawing Sheets

(58) Field of Classification Search
CPC ............... E06B 9/322; E06B 2009/285; E06B 2009/3222
See application file for complete search history.

(56) References Cited

U.S. PATENT DOCUMENTS

| | | | | | |
|---|---|---|---|---|---|
| 977,039 | A * | 11/1910 | Parrahm | A47H 1/13 | 248/259 |
| 1,017,574 | A * | 2/1912 | Marquis | A47H 1/13 | 248/260 |
| 1,570,747 | A * | 1/1926 | Jewett | A47H 1/13 | 248/254 |
| 1,613,780 | A * | 1/1927 | Bailey | A47H 1/13 | 248/255 |
| 1,643,061 | A * | 9/1927 | William | A47H 1/13 | 248/256 |
| 4,979,550 | A * | 12/1990 | Long | E06B 9/74 | 160/5 |
| 5,444,339 | A * | 8/1995 | Domel | E06B 9/364 | 318/400.41 |
| 5,547,008 | A * | 8/1996 | Sullivan | E06B 9/32 | 160/DIG. 17 |
| 5,598,000 | A | 1/1997 | Popat | | |
| 5,603,371 | A * | 2/1997 | Gregg | E06B 9/307 | 160/DIG. 17 |
| 5,663,621 | A | 9/1997 | Popat | | |
| 5,760,558 | A | 6/1998 | Popat | | |
| 6,084,231 | A | 7/2000 | Popat | | |
| 7,089,988 | B2 * | 8/2006 | Coleman | E06B 9/32 | 160/176.1 R |
| 8,643,321 | B2 * | 2/2014 | Leivenzon | E06B 9/72 | 318/463 |
| 9,206,638 | B1 * | 12/2015 | Malekpour | E06B 9/368 | |
| 9,470,040 | B2 * | 10/2016 | Hall | E06B 9/303 | |
| 9,661,123 | B1 | 5/2017 | Hall et al. | | |
| 9,667,804 | B1 | 5/2017 | Hall et al. | | |
| 9,909,363 | B1 | 3/2018 | Hall et al. | | |
| 9,911,891 | B1 | 3/2018 | Hall et al. | | |
| 9,988,841 | B2 | 6/2018 | Hall et al. | | |
| 10,057,163 | B2 | 8/2018 | Hall et al. | | |
| 10,087,680 | B1 | 10/2018 | Hall et al. | | |
| 10,138,675 | B2 | 11/2018 | Hall et al. | | |
| 10,205,421 | B2 | 2/2019 | Hall et al. | | |
| 10,215,797 | B2 | 2/2019 | Hall et al. | | |
| 10,312,856 | B2 | 6/2019 | Hall et al. | | |
| 11,414,927 | B1 * | 8/2022 | Popat | E06B 9/78 | |
| 11,608,679 | B2 * | 3/2023 | Schmidt | E06B 9/38 | |
| 11,624,234 | B2 * | 4/2023 | Zilberbaum | E06B 9/322 | 160/176.1 P |
| 2008/0303686 | A1 * | 12/2008 | Mosbrucker | E06B 9/322 | 160/168.1 P |
| 2015/0173548 | A1 * | 6/2015 | Lin | E06B 9/323 | 248/251 |
| 2017/0022754 | A1 | 1/2017 | Nien et al. | | |
| 2017/0329301 | A1 | 11/2017 | Hall et al. | | |
| 2017/0337049 | A1 | 11/2017 | Hall et al. | | |
| 2017/0362888 | A1 * | 12/2017 | Vinogradova | E06B 9/68 | |
| 2018/0030780 | A1 * | 2/2018 | Barnett | E06B 9/364 | |
| 2018/0030781 | A1 | 2/2018 | Hall et al. | | |
| 2018/0204967 | A1 | 7/2018 | Hall et al. | | |
| 2018/0283093 | A1 * | 10/2018 | Tseng | E06B 9/323 | |
| 2018/0302021 | A1 | 10/2018 | Hall et al. | | |
| 2018/0302029 | A1 | 10/2018 | Hall et al. | | |
| 2019/0113896 | A1 | 4/2019 | Hall et al. | | |
| 2019/0204145 | A1 | 7/2019 | Coorey | | |
| 2019/0208602 | A1 | 7/2019 | Shivell et al. | | |
| 2019/0257686 | A1 | 8/2019 | Popat | | |
| 2021/0131176 | A1 * | 5/2021 | Schmidt | E06B 9/322 | |
| 2021/0404248 | A1 | 12/2021 | Malekpour et al. | | |
| 2024/0240519 | A1 * | 7/2024 | Li | E06B 9/322 | |
| 2025/0243707 | A1 * | 7/2025 | Popat | H02S 20/26 | |

FOREIGN PATENT DOCUMENTS

| | | | |
|---|---|---|---|
| EP | 0803145 | A1 | 10/1997 |
| EP | 1496190 | A1 | 1/2005 |
| WO | 2017054083 | A1 | 4/2017 |

* cited by examiner

DEVICE FOR CONTROLLING OPENING AND CLOSING OF WINDOW BLINDS

FIELD

The present disclosure relates to a device for controlling the opening and closing of window blinds.

BACKGROUND

Manually operating window blinds so as to adjust the amount of light that is allowed to pass through the blinds can be a time-consuming process. In view of this, recent advances in home automation technology have led to the development of automated window blind controllers. Automated window blind controllers may allow a user to remotely control the opening and closing of window blinds.

Such window blind controllers suffer from a number of drawbacks, however. For example, window blinds are typically manufactured in the absence of any industry standard. As a result, blinds may vary widely in shape, dimension, and materials, making it difficult for a given a blind controller to be compatible across a wide range of different blind systems. In addition, in order to automate window blinds without first removing the blinds, it is generally necessary to attach a motorized drive module externally to the blinds. Such systems may need to be secured to the blinds' headrail using an adhesive, preventing future re-use of the device. Other systems may require wall-mounting of the blind controller, and as a result may require a long flexible coupling for reaching the blinds' tilting mechanism. Such a coupling may, however, detach during the rotation of the tilting mechanism, and is generally not aesthetically appealing.

SUMMARY

According to a first aspect of the disclosure, there is provided a device for controlling opening and closing of window blinds connected to a headrail, comprising: a clamping module for securing the device to the headrail, comprising: an upper clamp member for engaging an upper surface of the headrail; and a lower clamp member for engaging a lower surface of the headrail, and wherein the upper clamp member and the lower clamp member are movably coupled to each other so as to enable clamping of the headrail by the upper clamp member and the lower clamp member; and a drive module coupled to the clamping module and comprising: an actuator for connecting to a tilting mechanism configured to open and close the window blinds; and a drive mechanism operatively coupled to the actuator and configured to drive movement of the actuator such that the tilting mechanism is operated when connected to the actuator.

The drive mechanism may be configured to drive rotation of the actuator about a longitudinal axis of the actuator.

The actuator may comprise an elongate member having: a first end connected to an output of the drive mechanism; and a second end, opposite the first end, for connecting to the tilting mechanism.

The second end may comprise a curved member for connecting to the tilting mechanism.

The curved member may comprise a hook, a loop, or a clip.

The drive mechanism may comprise a motor.

The device may further comprise: a processor; and a computer-readable storage medium having computer program code stored thereon and configured, when executed by the processor, to cause the processor to perform a method comprising operating the drive mechanism by: reading one or more instructions received at the processor; and operating the drive mechanism based on the one or more instructions.

The device may further comprise one or more sensors communicative with the processor and positioned relative to the drive module so as to sense one or more of an ambient light level and an ambient temperature beneath the drive module when the clamping module is secured to the headrail.

The one or more sensors may be located on a first side of a printed circuit board, and the printed circuit board may have a second side opposite the first side and facing toward a top of the drive module.

The actuator may be extendable along a longitudinal axis of the actuator.

The actuator may be movable within at least four degrees of freedom that include rotation of the actuator about the longitudinal axis and extension of the actuator along the longitudinal axis.

The actuator may be connected to an output of the drive mechanism via a universal joint.

The drive module may be removably coupled to the clamping module.

The drive module may further comprise one or more ratchet mechanisms, the clamping module may further comprise teeth for engaging with the one or more ratchet mechanisms, and the one or more ratchet mechanisms and the teeth may be configured to: prevent relative movement in a first direction between the drive module and the clamping member; and allow relative movement in a second direction, opposite the first direction, between the drive module and the clamping member.

The device may further comprise a release mechanism for urging the one or more ratchet mechanisms out of engagement with the teeth of the clamping module.

The clamping module may further comprise a pair of legs spaced apart and defining an aperture therebetween.

The actuator may be extendable through the aperture.

One of the upper clamp member and the lower clamp member may comprise a pair of spaced-apart legs, and the other of upper clamp member and the lower clamp member may comprise a pair of apertures configured for sliding therethrough the spaced-apart legs.

The device may further comprise a locking device for preventing movement of the upper clamp member relative to the lower clamp member.

One of the upper clamp member and the lower clamp member may comprise a pair of spaced-apart legs, the other of upper clamp member and the lower clamp member may comprise a pair of apertures configured for sliding therethrough the spaced-apart legs, and the locking device may comprise one or more locking doors movable between: an open position in which the legs are slidable within the apertures; and a closed position in which the legs are prevented from sliding through the apertures.

The locking device may comprise a compressible material provided thereon for increasing friction between the legs and the other of upper clamp member and the lower clamp member.

The legs may comprise surface features provided thereon for increasing friction between the legs and the compressible material.

One or more of the upper clamp member and the lower clamp member may comprise a compressible material for engaging the upper and lower surfaces of the headrail.

According to a further aspect of the disclosure, there is provided a system comprising: window blinds connected to a headrail comprising a tilting mechanism for opening and closing the window blinds; and a device for controlling opening and closing of the window blinds, wherein the device is secured to the headrail and comprises: a clamping module comprising: an upper clamp member engaging an upper surface of the headrail; and a lower clamp member movably coupled to the upper clamp member and engaging a lower surface of the headrail; and a drive module coupled to the clamping module and comprising: an actuator connected to the tilting mechanism; and a drive mechanism operatively coupled to the actuator and configured to drive movement of the actuator so as to open or close the window blinds.

According to a further aspect of the disclosure, there is provided a kit of parts comprising: a clamping module for securing to a headrail of a window blind system, the clamping module comprising: an upper clamp member for engaging an upper surface of the headrail; and a lower clamp member for engaging a lower surface of the headrail, and wherein the upper clamp member and the lower clamp member are movably coupled to each other so as to enable clamping of the headrail by the upper clamp member and the lower clamp member; and a drive module for coupling to the clamping module and comprising: an actuator for connecting to a tilting mechanism of the window blind system; and a drive mechanism operatively coupled to the actuator and configured to drive movement of the actuator such that the tilting mechanism is operated when connected to the actuator.

According to a further aspect of the disclosure, there is provided a method of installing a device for controlling opening and closing of window blinds connected to a headrail, wherein: the device comprises: a clamping module comprising: an upper clamp member; and a lower clamp member movably coupled to the upper clamp member; and a drive module for coupling to the clamping module and comprising: an actuator; and a drive mechanism operatively coupled to the actuator and configured to drive movement of the actuator; and the method comprises: securing the clamping module to the headrail by: engaging the upper clamp member with an upper surface of the headrail; engaging the lower clamp member with a lower surface of the headrail; and preventing relative movement between the upper clamp member and the lower clamp member; coupling the drive module to the clamping module; and connecting the actuator to a tilting mechanism configured to control opening and closing of the blinds.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Figure 1:
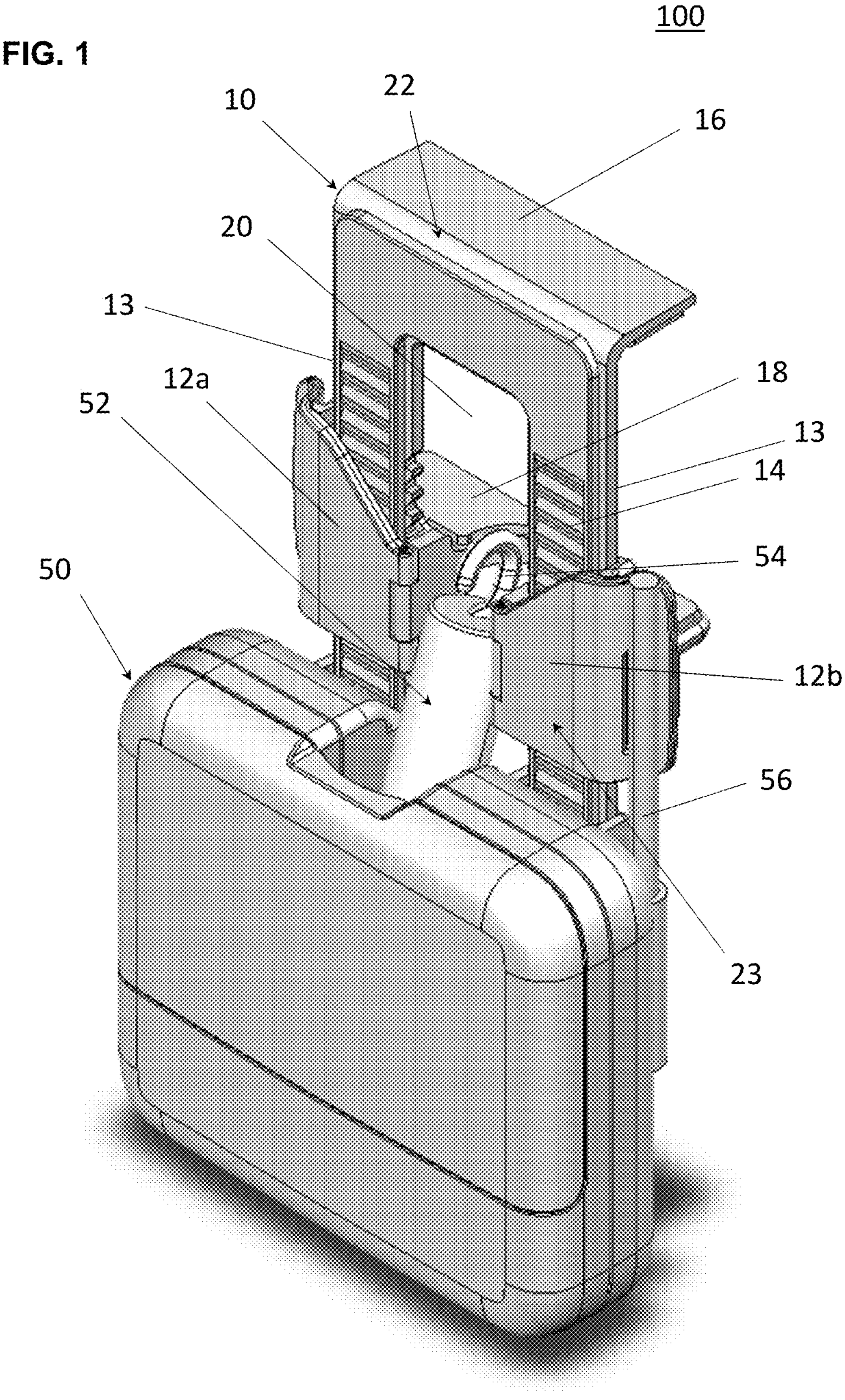
FIG. 1 is a front perspective view of a blind control device according to an embodiment of the disclosure.

The present disclosure seeks to provide an improved window blind controller. While various embodiments of the disclosure are described below, the disclosure is not limited to these embodiments, and variations of these embodiments may well fall within the scope of the disclosure which is to be limited only by the appended claims.

Generally, according to embodiments of the disclosure, there is provided a device for controlling the opening and closing of window blinds connected to a headrail. The device includes a clamping module that may allow the device to be easily secured to a wide range of different headrails, and may be easily fitted to window blind systems that have already been installed. The clamping module includes an upper clamp member for engaging an upper surface of the headrail, and a lower clamp member for engaging a lower surface of the headrail. The upper and lower clamp members are movably coupled to one another. For example, the upper clamp member may be positioned to engage the upper surface of the headrail, and the lower clamp member may be moved (for example, in a sliding manner) relative to the upper clamp member to engage the lower surface of the headrail and achieve clamping of the headrail. Embodiments of the present disclosure therefore provide a blind control device that may be installed without the need to remove components from and/or disassemble an existing window blind system.

The device further includes a drive module that is detachably secured to the clamping module. The drive module may be detached from the clamping module, for example if maintenance or replacement of one or more components within the drive module is required. The drive module includes an actuator for connecting to a tilting mechanism housed within the headrail and configured to open and close the window blinds. For example, the actuator may be movable within multiple degrees of freedom, and may be extendable, so as to enable the actuator to reach the titling mechanism. The clamping module may provide a reliable anchor point against which the drive mechanism may move or rotate the actuator.

The drive module further includes a drive mechanism, such as motor, operatively coupled to the actuator and configured to drive movement, such as rotation, of the actuator such that the tilting mechanism is operated when connected to the actuator. The drive mechanism may be operated remotely, and for example may be operated in response to a user activating a remote control that may wirelessly communicate with a processor onboard or external to the device. Instructions sent by the remote control may be processed by the processor and may result in the processor operating the drive mechanism based on the instructions. In this context, a remote control may include, for example, a user's mobile device, and the instructions may be sent from the mobile device to the blind control device in response to a user interacting with an application loaded onto the mobile device, and in response to the application communicating with the blind control device via a cloud software API, for example.

According to some embodiments, a computer-readable memory may be programmed with instructions that, when read by the processor, may result in the processor executing the instructions. For example, the processor and memory may be configured to operate the drive mechanism so as to close the blinds in response to a monitored light intensity reaching a threshold, or in response to a clock reading a certain time of day. Conversely, the processor and memory may be configured to operate the drive mechanism so as to open the blinds in response to a monitored light intensity dropping below a threshold, or in response to a clock measuring a certain time of day. According to some embodiments, the processor and memory may be configured to operate the drive mechanism so as to close or open the blinds in response to a change in temperature (using, for example, a temperature sensor), or in response to certain occupancy information or detected human activity (e.g. whether one or more humans are determined to be asleep or awake), using, for example, a proximity sensor or motion sensor.

According to embodiments of the present disclosure, in order to ease the installation process, the clamping module may be separated from the drive module. For example, the clamping module on its own may first be secured by the headrail by leveraging existing gaps around the headrail, so that the clamping module may be clamped to a variety of different-sized headrails. Once the clamping module is locked in place, the drive module may be attached to the clamping module, for example by engaging ratchet mechanisms on the drive module with corresponding teeth provided on the clamping module. Once the ratchet is engaged with the teeth, the drive module may be prevented from being moved relative to the clamping module in a direction away from the headrail. However, the ratchet and teeth may be configured such that the drive module may be allowed to move relative to the clamping module in a direction toward the headrail. The relative distance between the drive module and the headrail may therefore be adjusted by moving (for example, sliding) the drive module along the teeth of the clamping module, with the ratchet preventing the drive module from sliding off the clamping module.

Previous means of attaching an electromechanical module to a tilting mechanism of a window blind system typically required removal and/or disassembly of the headrail so that the module may be positioned within the headrail. In such cases, the headrail would have to have been large enough to receive the electronics. Alternatively, the electromechanical module would have to have been glued to anchor points on the surface of the headrail, or wall-mounted next to the window. Embodiments of the disclosure may avoid all such requirements.

Figure 2:
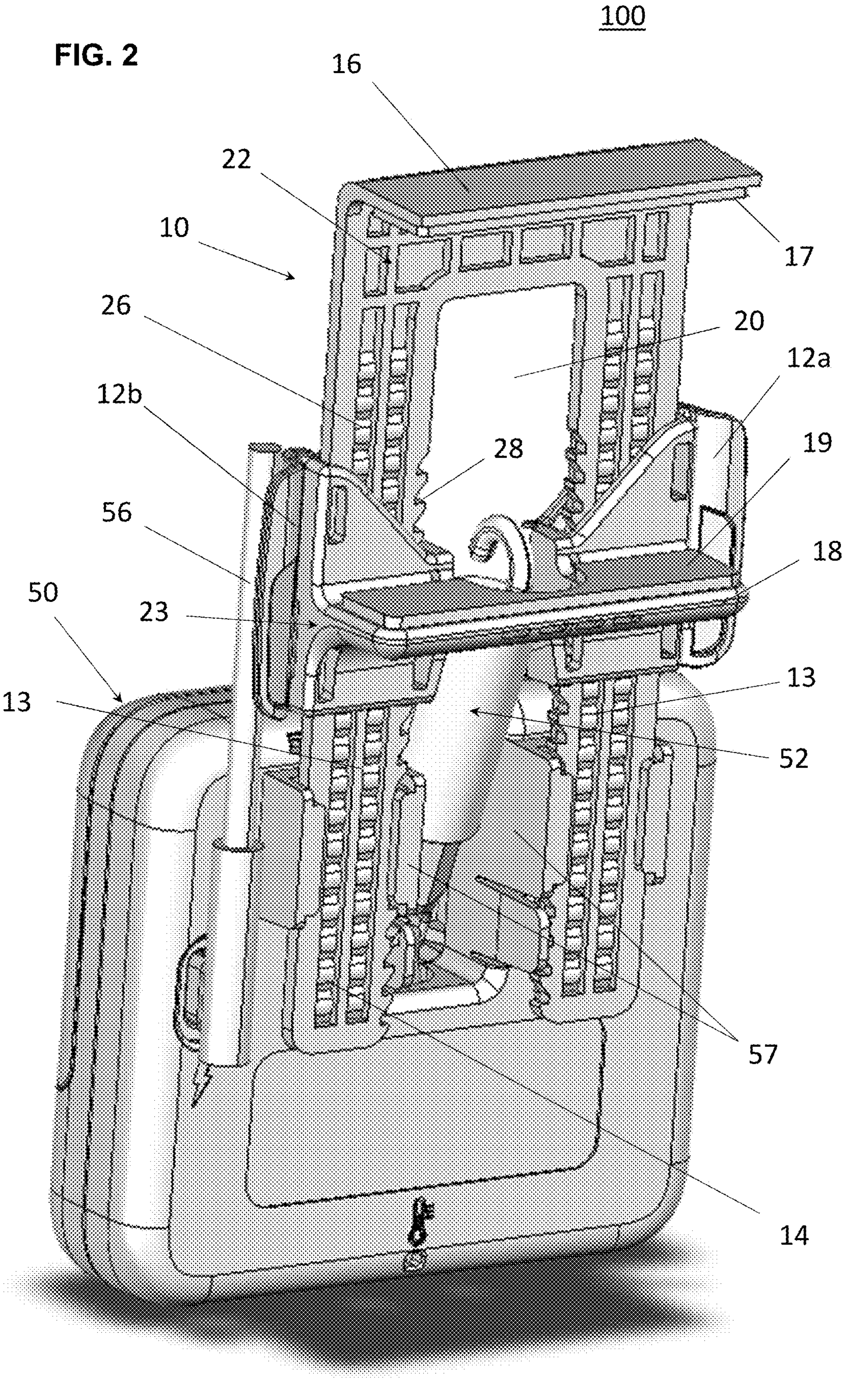
FIG. 2 is a rear perspective view of the blind control device of FIG. 1, according to an embodiment of the disclosure.

Turning to FIGS. 1 and 2, there is now shown a blind control device 100 according to an embodiment of the disclosure.

Blind control device 100 includes a clamping module 10 releasably connected or coupled to a drive module 50. As will be described in further detail, clamping module 10 includes an upper clamp member 22 and a lower clamp member 23 moveably coupled to one another and configured to enable blind control device 100 to be secured to the headrail of a window blind system.

Upper clamp member 22 includes, at an upper end thereof, an upper bracket 16 extending from a pair of vertical legs 13 received within lower clamp member 23. In particular, legs 13 are received within apertures or slots extending through lower clamp member 23. Legs 13 of clamping module 10 generally define an upside-down U-shape, and are spaced apart from one another so as to define an aperture 20 extending therebetween. As described in further detail below, an actuator forming part of drive module 50 may extend through aperture 20 to reach the tilting mechanism of the window blind system.

Figure 9:
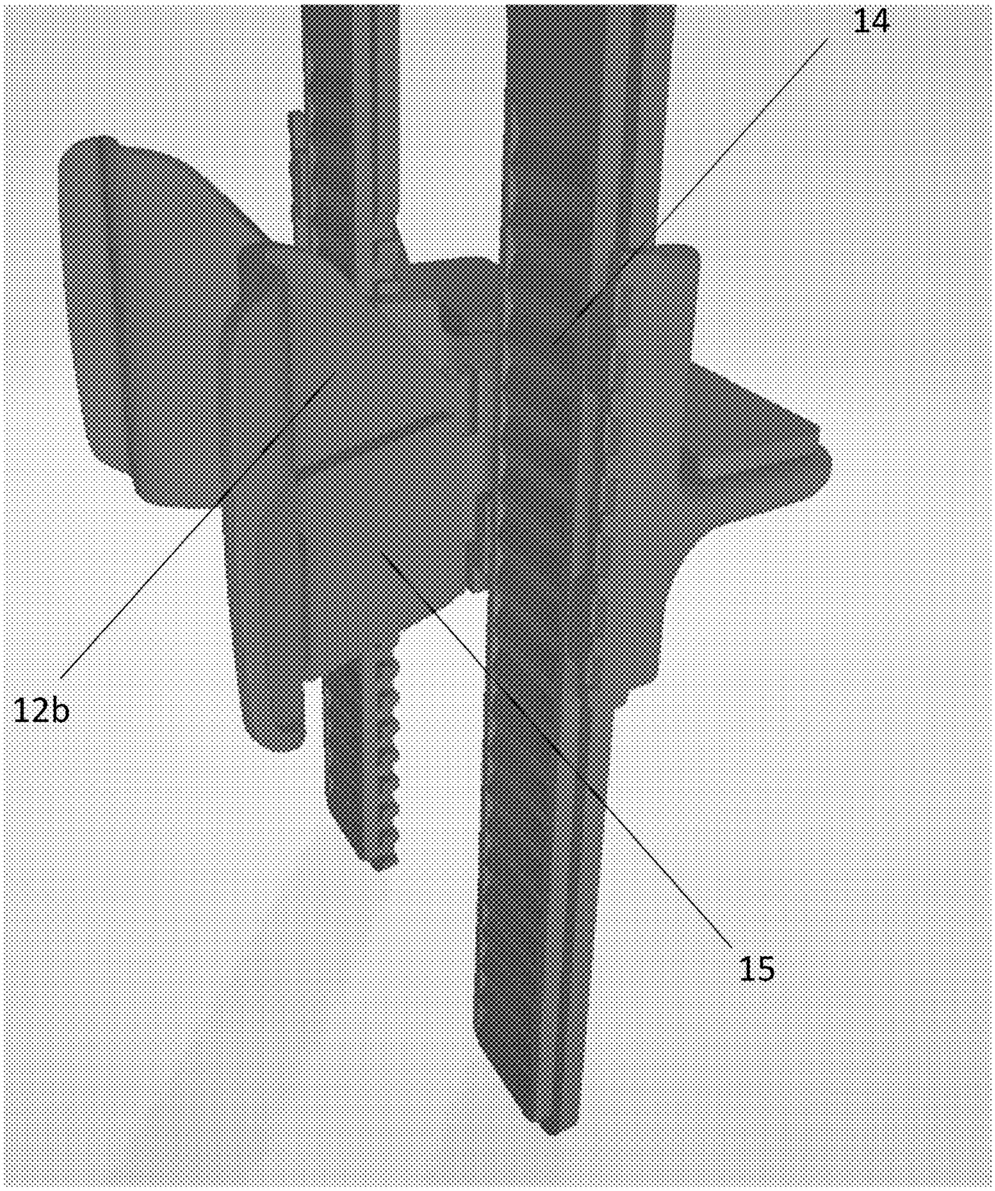
FIG. 9 is a schematic view of a locking door in an opened state, according to an embodiment of the disclosure.

As can be seen in more detail in FIG. 2, lower clamp member 23 includes a lower bracket 18 opposed to and spaced apart from upper bracket 16. A pair of hinging locking doors 12*a* and 12*b* are also provided on lower clamp member 23. On interior surfaces of locking doors 12*a* and 12*b* are provided pads 15 that may comprise, for example, silicon foam. When locking doors 12*a* and 12*b* are securely closed (using, for example, a suitable snap-fit connection or the like), the silicon foam bears against ribbed features 14, or other similar surface featuring, provided on legs 13. The combination of the compression of the silicon foam against legs 13 and ribbed features 14 increases the friction between upper clamp member 22 and lower clamp member 23, and ensures that upper clamp member 22 and lower clamp member 23 are no longer slidable relative to one another. Opening of locking doors 12*a* and 12*b* removes the friction exerted by silicon foam pads on ribbed features 14 of legs 13, and enables upper clamp member 22 and lower clamp member 23 to be moved relative to one another, by sliding legs 13 through the apertures extending through lower clamp member 23. FIG. 9 shows locking door 12*b* in an opened state, revealing pad 15 provided on an interior surface of locking door 12*b*.

According to some embodiments, other types of locking devices may be used to secure upper clamp member 22 to lower clamp member 23. For example, instead of using hinging doors, a device may be used to alternately bring the foam pads into and out of contact with ribbed features 14 of legs 13.

Drive module 50 includes a housing that contains the various electronic and mechanical components that are used to drive opening and closing of the blinds. Drive module 50 further includes an extendable actuator 52 that is connected to the window blind system's tilting mechanism typically extending out of the headrail, as described in further detail below. Actuator 52 includes a hook 54 or similar curved member (such as a loop or clip) provided at an end of actuator 52 and that is used to mechanically connect actuator 52 to the tilting mechanism. As described above, drive module 50 is releasably connected to clamping module 10 through the use of ratchet mechanisms provided on drive module 50 and teeth 28 provided on the edges of legs 13 of clamping module 10. A charging cable 56 (such as a USB charging cable) may be used to recharge a battery 64 provided within drive module 50.

Figure 7:
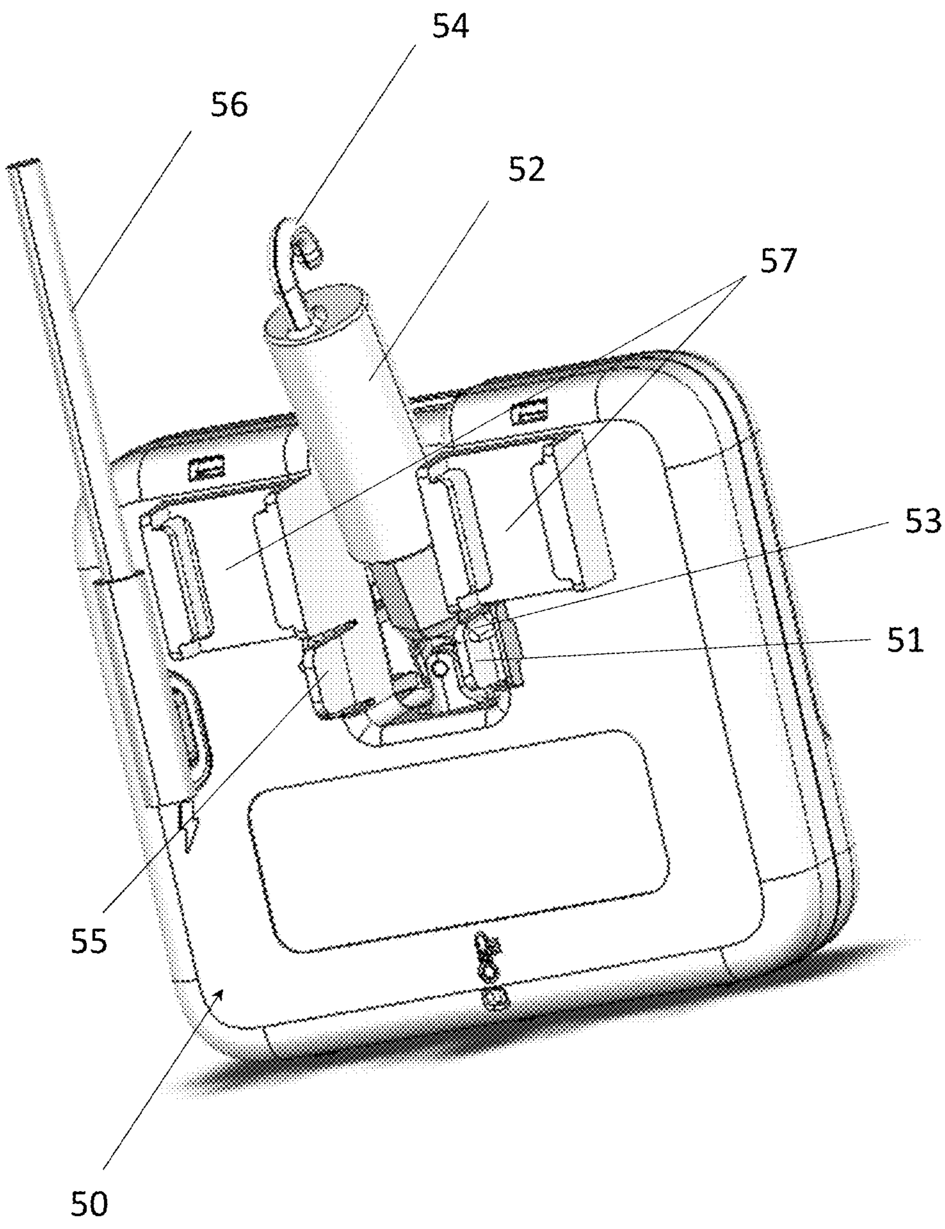
FIG. 7 is a rear perspective view of the drive module of the blind control device of FIG. 1, according to an embodiment of the disclosure.

FIG. 7 shows a view of the rear side of drive module 50, with clamping module 10 removed for clarity. As can be seen, a pair of guide members 57 are provided. Guide members 57 are configured to slidably receive legs 13 therethrough and assist with guiding the translation of clamping module 10 relative to drive module 50. Beneath guide members 57 are provided a pair of ratchet mechanisms 51. Each ratchet mechanism 51 includes a locking tooth 53 for engaging with teeth 28. Ratchet mechanisms 51 are resiliently biased so as to enable locking teeth 53 to engage with teeth 28 of legs 13 when legs 13 are slid through guide members 57 and subsequently past ratchet mechanisms 51. As a result, clamping module 10 may be freely translated in only a first direction relative to drive module 50 while being prevented from moving relative to drive module 50 in a second direction opposite the first direction.

Each ratchet mechanism 51 further includes a ramped portion 55. Pushing a release mechanism 62 provided on a front side of drive module 50 causes release mechanism 62 to engage ramped portions 55 of ratchet mechanisms 51 and thereby urge locking teeth 53 away from teeth 28 of legs 13, disengaging legs 13 from ratchet mechanisms 51. As a result, clamping module 10 may be freely translated in both the first and second directions relative to drive module 50, and may be decoupled from drive module 50.

Figure 3:
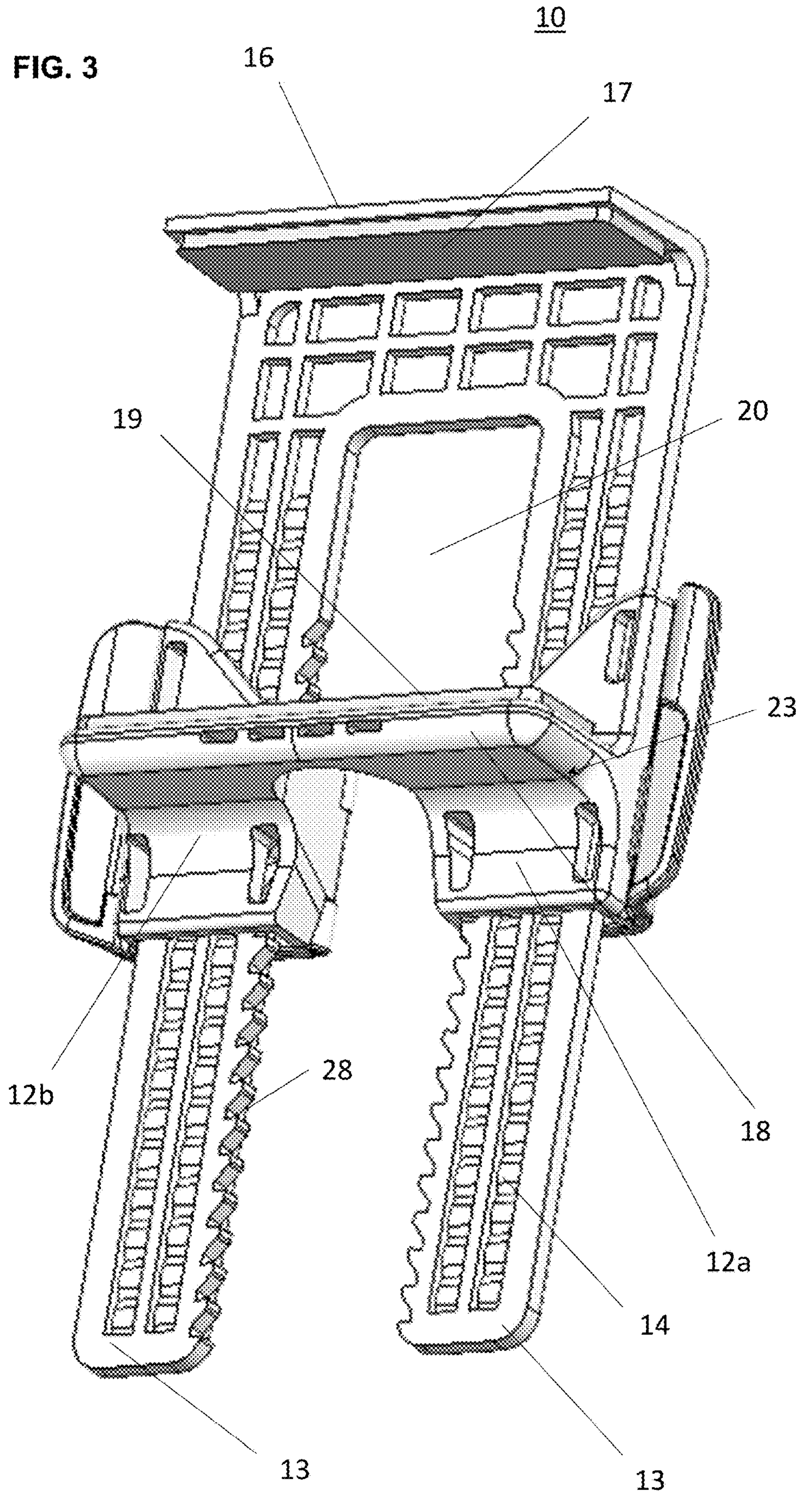
FIG. 3 is a rear perspective view of the clamping device of the blind control device of FIG. 1, according to an embodiment of the disclosure.
Figure 4:
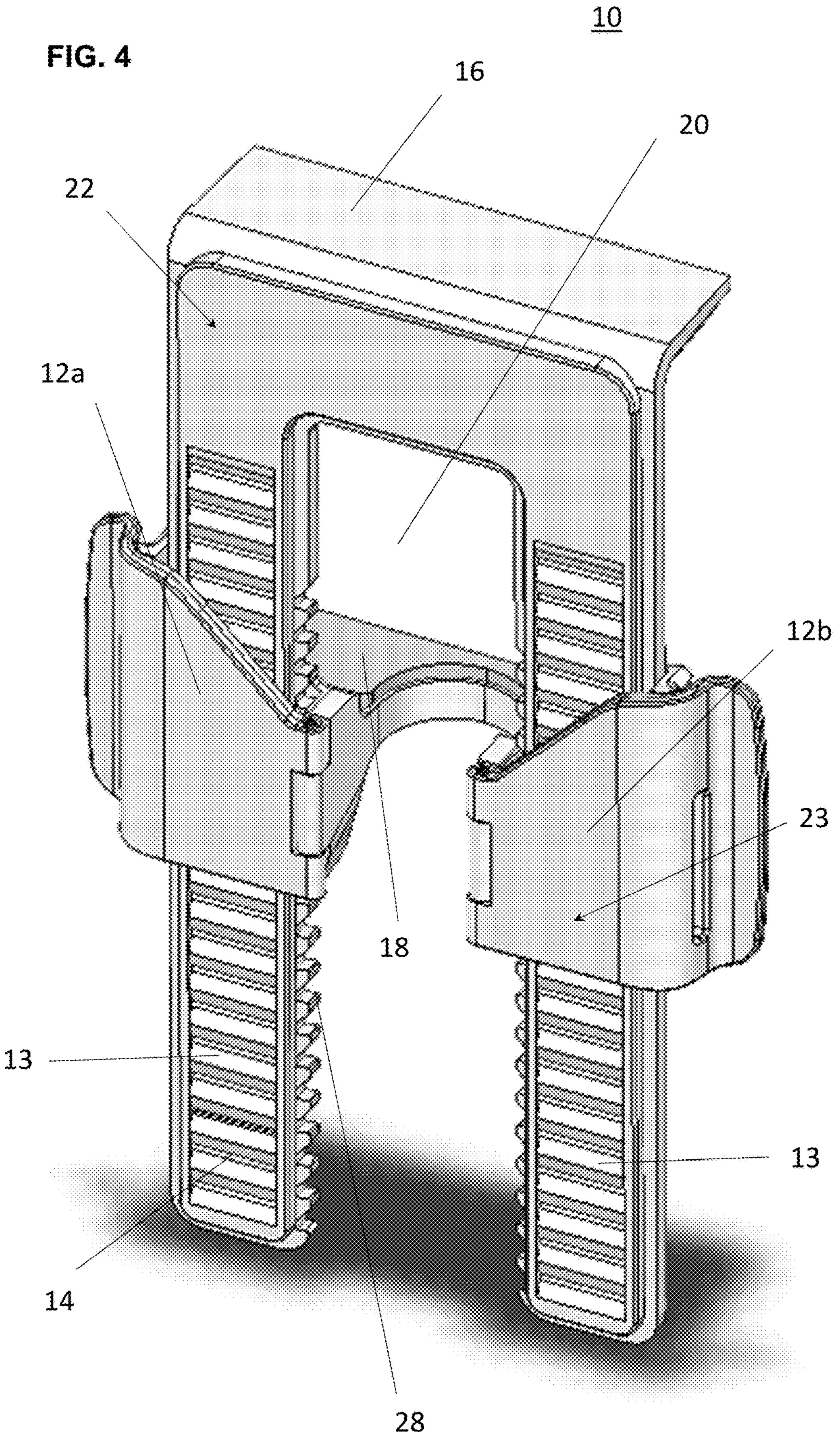
FIG. 4 is a front perspective view of the clamping device of FIG. 3, according to an embodiment of the disclosure.

Turning to FIGS. 3 and 4, there are shown rear and front sides, respectively, of clamping module 10. As can be seen, each of upper clamp 16 and lower clamp 18 is provided with a strip of elastomeric material 17, 19. Elastomeric material 17, 19 may enable an improved clamping force to be applied to the headrail when upper clamp 16 and lower clamp 18 are engaged with the upper surface and lower surface of headrail, respectively. Elastomeric material 17, 19 may comprise a high-resilience material allowing a long-term compressive force to be applied to the headrail. According to some embodiments, elastomeric material 17, 19 comprises silicon foam.

Figure 5:
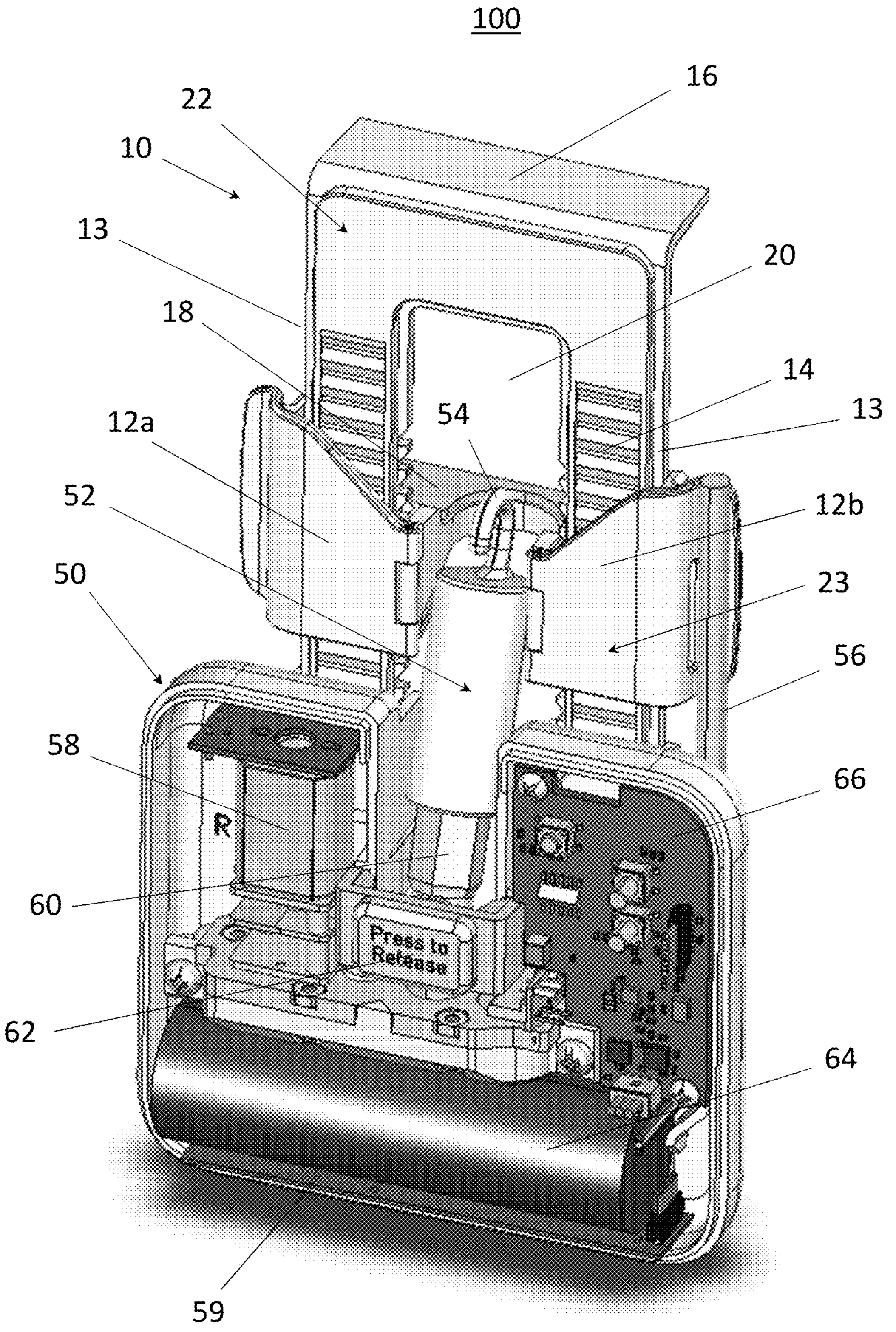
FIG. 5 is a front perspective view of the blind control device of FIG. 1, with front paneling removed to show the interior of the drive module, according to an embodiment of the disclosure.
Figure 6:
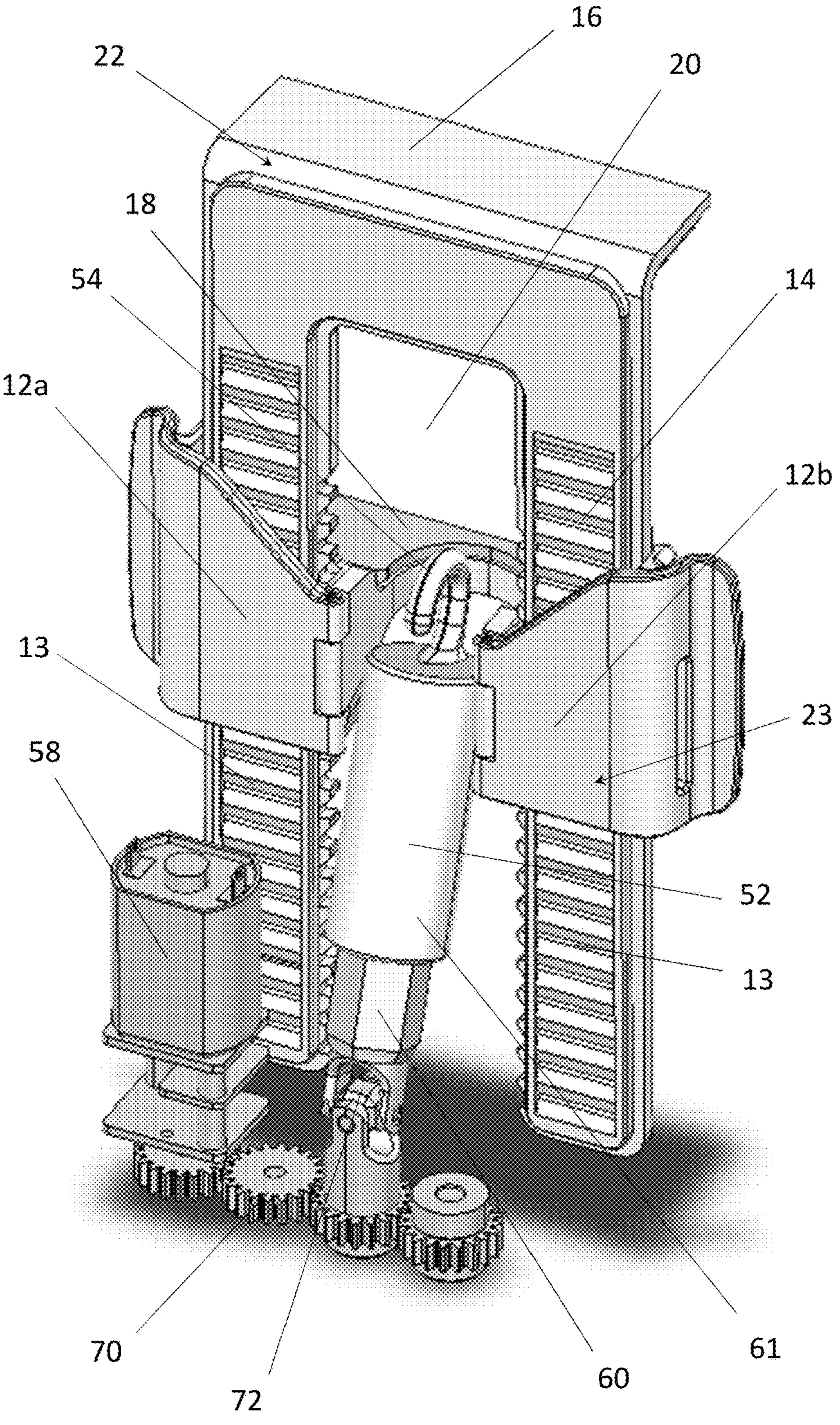
FIG. 6 is a front perspective view of the blind control device of FIG. 1, with certain components removed from the drive module, according to an embodiment of the disclosure.

Turning to FIG. 5, there is shown blind control device 100 with a portion of the housing of drive module 50 removed so as to reveal the internal components of drive module 50. Drive module 50 houses a motor 58 which, as shown in more detail in FIG. 6, is operatively connected to actuator 52. Drive module 50 further houses control board 66. Various electronic components, including a processor (not shown), are provided on control board 66 and are configured to enable blind control device 100 to perform its various functions, such as operating actuator 52 in order to open and close window blinds. A wireless communication hardware component (not shown) is also provided on control board 66 and connected to an antenna, for receiving instructions transmitted to blind control device 100 for processing by the processor. Drive module 50 further houses a battery 64 for providing power to the processor, motor 58, and various other electronic components within drive module 50. As mentioned above, also provided within drive module 50 is release mechanism 62 to enable drive module 50 to be decoupled from clamping module 10, by disengaging locking teeth 53 from teeth 28 of legs 13.

A sensor board 59 is located beneath battery 64 and may include various sensors, such as (but not limited to) a temperature sensor, a light sensor, a motion sensor, a radar sensor, a proximity sensor, and a magnetic sensor. Readings from the sensors may be received and processed by the processor, and may determine how and when motor 58 drives rotation of actuator 52. Sensor board 59 is located such that the sensors provided thereon are oriented downwardly, toward the floor when blind control device 100 is installed. Such a positioning of sensor board 59 may be advantageous, in that the light and temperatures sensors may obtain readings of light and temperature proximate a window. Temperature readings obtained in this manner may, for example, be useful in understanding the thermal gradient between the building envelope and the building's exterior.

Ambient light readings obtained in this manner may provide a more accurate representation of the actual intensity of the ambient light.

Turning to FIG. 6, there is shown blind control device 100 with certain components of drive module 50 removed for clarity. As can be seen, an output of motor 58 is operatively connected to a universal joint 72 via an arrangement of gears 70. A lower end of actuator 52 (e.g. an end of inner actuator portion 60 described below) is connected to universal joint 72. Operation of motor 58 therefore results in rotation of universal joint 72 and corresponding rotation of actuator 52 about a longitudinal axis defined by actuator 52. Universal joint 72 enables actuator 52 to move within multiple degrees of freedom. In particular, in addition to being rotatable about its longitudinal axis, actuator 52 may pivot about two perpendicular axes defined by universal joint 72.

According to some embodiments, different types of connections may be provided between the output of motor 58 and actuator 52, and universal joint 72 is only one suitable type of connection that may be used.

Actuator 52 is furthermore extendable along its longitudinal axis. As can be seen in FIG. 6, actuator 52 includes inner actuator portion 60 telescopically arranged relative to an outer actuator portion 61 provided over inner actuator portion 60. Inner actuator portion 60 and outer actuator portion 61 may telescope relative to another. Thus, actuator 52 may extend through aperture 20 defined between legs 13 of clamping module 10 to reach the tilting mechanism (typically extending out of the headrail) of the window blind system.

In order to install blind control device 100, the user first removes any existing tilt wand of the target window blind system. Locking doors 12*a* and 12*b* are opened so as to enable lower clamp member 23 to be moved relative to upper clamp member 22. The user may then full open clamping module 10, by fully moving lower clamp member 23 away from upper clamp member 22. With the clamp fully opened, clamping module 10 is roughly center-aligned relative to the tilting mechanism of the window blind system. Upper bracket 16 is then inserted into the gap between the headrail and the window frame/ceiling. Lower bracket 18 is then translated relative to upper bracket 16, by sliding lower clamp member 23 over legs 13 of upper clamp member 22. During the engagement of lower bracket 18 and upper bracket 16 with the bottom and top surfaces of the headrail, elastomeric pads 17, 19 are compressed. The compression of elastomeric pads 17, 19 may provide the force that is required for clamping module 10 to be securely fixed to the headrail. With lower bracket 18 engaged to the lower surface of the headrail, locking doors 12*a*, 12*b* are closed and locked using a suitable snap-fit connection or the like, to lock upper clamp member 22 relative to lower clamp member 23.

Subsequently, the user engages drive module 50 with clamping module 10, by sliding legs 13 through guide members 57, and engaging locking teeth 53 of ratchet mechanisms 51 with teeth 28 of legs 13. Drive module 50 may then be translated upward toward the headrail to a suitable position from which actuator 52 may reach the tilting mechanism of the window blind system. Actuator 52 is then connected to the tilting mechanism by extending actuator 52 through aperture 20 defined between legs 13 of clamping module 10. In particular, hook 54 of actuator 52 may be connected to the tilting mechanism.

Alternatively, actuator 52 may first be connected to the tilting mechanism, and subsequently drive module 50 may then be coupled to clamping module 10 as described above. In this case, after clamping module 10 has been secured to the headrail, outer actuator portion 61 may be removed from inner actuator portion 60 and connected to the tilting mechanism. Then, the drive module 50 may be coupled to the clamping module 10 while simultaneously guiding inner actuator portion 60 back into outer actuator portion 61. In order to assist with the guiding of inner actuator portion 60 back into outer actuator portion 61, one or more magnetic components and/or a blind mate connection may be used.

Figure 8:
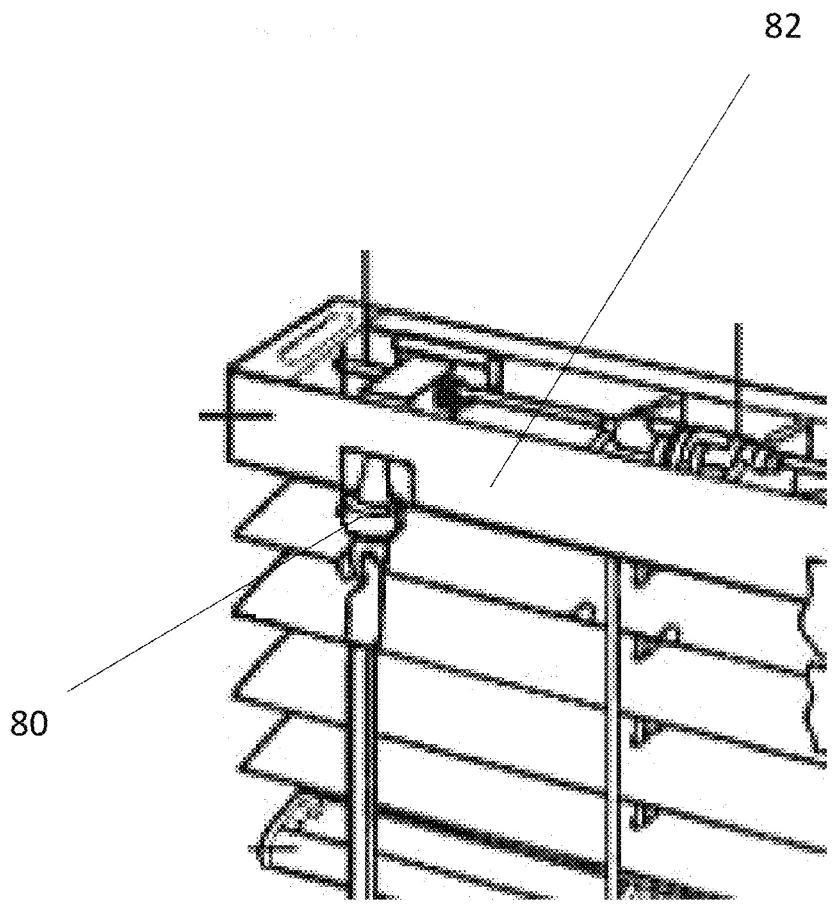
FIG. 8 is a schematic view of a tilting mechanism for opening and closing window blinds.

An example of a tilting mechanism 80 protruding out of a headrail 82 is shown in FIG. 8 (FIG. 8 also shows a conventional tilting wand, connected to tilting mechanism 80, which would first be removed when installing the blind control device described herein).

Clamping module 10 is designed to provide sufficient friction force so that drive module 50 can rotate the tilt mechanism daily. In order to enable a wide range of compatibility between blind control device 100 and various window blind systems, clamping module 10 is generally only limited by the height of the headrail. Typically, a 3 mm or larger gap exists between the headrail and the window frame/ceiling, which is enough for upper bracket 16 to be located therein. Furthermore, telescopic actuator 52 and universal joint 72 enable actuator 52 to drive differently sized and shaped tilting mechanisms with a loose spatial alignment.

According to some embodiments, and to provide a more reliable installation, a mechanical indicator may be added to confirm clamping device 10 is secured to the headrail with sufficient force. Still further, according to some embodiments, a telescopic hook extending from lower bracket 18 to the rear side of the headrail may be added, to create a positive lock to prevent clamping module 10 from falling off the headrail.

While blind control device 100 has been described primarily in the context of an actuator rotating in order to operate the opening and closing of the blinds, it shall be understood that the present disclosure extends to other forms of movement in which the actuator may trigger the opening or closing of the blinds, by interacting with the tilting mechanism. For example, according to some embodiments, the drive mechanism of the drive module may be configured to impart linear motion to the actuator, and the tilting mechanism may be configured to initiate opening or closing of the window blinds in response to such linear motion.

Furthermore, while blind control device 100 has been described primarily in the context of an actuator being connected directly to a tilting mechanism configured to open and close window blinds, it shall be understood that the disclosure extends to blind control devices that may be used to open/close window blinds using an actuator that couples to pull cords connected to a tilting mechanism of a blind system. For example, instead of using a telescopic actuator and a hook, an alternative actuator may connect directly to pull cords of a blind system, the pull cords being connected to the tilting mechanism of the blind system. In such a case, actuation of the actuator may cause the actuator to exert a pulling force on one or more of the pull cords, so as to open/close the blinds.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A device for controlling opening and closing of window blinds connected to a headrail, comprising:
- a clamping module for securing the device to the headrail, comprising:
  - an upper clamp member for engaging an upper surface of the headrail; and
  - a lower clamp member for engaging a lower surface of the headrail, and
- wherein the upper clamp member and the lower clamp member are movably coupled to each other so as to enable clamping of the headrail by the upper clamp member and the lower clamp member;
- a drive module coupled to the clamping module and comprising:
  - an actuator for connecting to a tilting mechanism configured to open and close the window blinds; and
  - a drive mechanism operatively coupled to the actuator and configured to drive movement of the actuator such that the tilting mechanism is operated when connected to the actuator;
- one or more ratchet mechanisms; and
- teeth for engaging with the one or more ratchet mechanisms,
- wherein the one or more ratchet mechanisms and the teeth are configured to:
  - prevent relative movement in a first direction between the drive module and the upper clamp member or the lower clamp member; and
  - allow relative movement in a second direction, opposite the first direction, between the drive module and the upper clamp member or the lower clamp member.

2. The device of claim 1, wherein the drive mechanism is configured to drive rotation of the actuator about a longitudinal axis of the actuator.

3. The device of claim 1, wherein the drive mechanism comprises a motor.

4. The device of claim 1, further comprising:
- a processor;
- a computer-readable storage medium having computer program code stored thereon and configured, when executed by the processor, to cause the processor to perform a method comprising operating the drive mechanism by:

reading one or more instructions received at the processor; and operating the drive mechanism based on the one or more instructions; and one or more sensors communicative with the processor and positioned relative to the drive module so as to sense one or more of an ambient light level and an ambient temperature beneath the drive module when the clamping module is secured to the headrail.

5. The device of claim 1, wherein the actuator is connected to an output of the drive mechanism via a universal joint.

6. The device of claim 1, wherein:

one of the upper clamp member and the lower clamp member comprises a pair of spaced-apart legs; and the other of upper clamp member and the lower clamp member comprises a pair of apertures configured for sliding therethrough the spaced-apart legs.

7. The device of claim 1, further comprising a locking device for preventing movement of the upper clamp member relative to the lower clamp member.

8. The device of claim 1, wherein one or more of the upper clamp member and the lower clamp member comprises a compressible material for engaging the upper and lower surfaces of the headrail.

9. The device of claim 1, wherein the actuator comprises an inner actuator portion telescopically arranged relative to an outer actuator portion provided over the inner actuator portion, such that the inner actuator portion is configured to telescope relative to the outer actuator portion, and wherein the actuator further comprises one or more magnetic components to guide the inner actuator portion relative to the outer actuator portion.

10. The device of claim 1, wherein the actuator comprises an elongate member having:

a first end connected to an output of the drive mechanism; and a second end, opposite the first end, for connecting to the tilting mechanism.

11. The device of claim 10, wherein the second end comprises a curved member for connecting to the tilting mechanism.

12. The device of claim 11, wherein the curved member comprises a hook, a loop, or a clip.

13. The device of claim 1, wherein the actuator is extendable along a longitudinal axis of the actuator.

14. The device of claim 13, wherein the actuator is movable within at least four degrees of freedom that include rotation of the actuator about the longitudinal axis and extension of the actuator along the longitudinal axis.

15. The device of claim 1, wherein the drive module is removably coupled to the clamping module.

16. The device of claim 15, wherein:

the drive module further comprises the one or more ratchet mechanisms; and the clamping module further comprises the teeth.

17. The device of 16, further comprising a release mechanism for urging the one or more ratchet mechanisms out of engagement with the teeth of the clamping module.

18. The device of claim 1, wherein the clamping module further comprises a pair of legs spaced apart and defining an aperture therebetween.

19. The device of claim 18, wherein the actuator is extendable through the aperture.

20. A system comprising:

window blinds connected to a headrail comprising a tilting mechanism for opening and closing the window blinds; and a device for controlling opening and closing of the window blinds, wherein the device is secured to the headrail and comprises:

a clamping module comprising:

an upper clamp member engaging an upper surface of the headrail; and a lower clamp member movably coupled to the upper clamp member and engaging a lower surface of the headrail;

a drive module coupled to the clamping module and comprising:

an actuator connected to the tilting mechanism; and a drive mechanism operatively coupled to the actuator and configured to drive movement of the actuator so as to open or close the window blinds;

one or more ratchet mechanisms; and teeth for engaging with the one or more ratchet mechanisms, wherein the one or more ratchet mechanisms and the teeth are configured to:

prevent relative movement in a first direction between the drive module and the upper clamp member or the lower clamp member; and allow relative movement in a second direction, opposite the first direction, between the drive module and the upper clamp member or the lower clamp member.

21. A kit of parts comprising:

a clamping module for securing to a headrail of a window blind system, the clamping module comprising:

an upper clamp member for engaging an upper surface of the headrail;

a lower clamp member for engaging a lower surface of the headrail; and teeth, and wherein the upper clamp member and the lower clamp member are movably coupled to each other so as to enable clamping of the headrail by the upper clamp member and the lower clamp member; and a drive module for coupling to the clamping module and comprising:

an actuator for connecting to a tilting mechanism of the window blind system;

a drive mechanism operatively coupled to the actuator and configured to drive movement of the actuator such that the tilting mechanism is operated when connected to the actuator; and one or more ratchet mechanisms for engaging with the teeth, wherein the one or more ratchet mechanisms and the teeth are configured to:

prevent relative movement in a first direction between the drive module and the upper clamp member or the lower clamp member; and allow relative movement in a second direction, opposite the first direction, between the drive module and the upper clamp member or the lower clamp member.

* * * * *